US011529562B2

(12) United States Patent
Law et al.

(10) Patent No.: US 11,529,562 B2
(45) Date of Patent: Dec. 20, 2022

(54) FRIEND RECOMMENDATIONS FOR ONLINE VIDEO GAME PLAYERS

(71) Applicant: Electronic Arts, Inc., Redwood City, CA (US)

(72) Inventors: Everest Law, Los Angeles, CA (US); Christopher Albert Pierse, Mountain View, CA (US); Lisa Renee Ryan, Union City, CA (US)

(73) Assignee: Electronic Arts Inc., Redwood City, CA (US)

( * ) Notice: Subject to any disclaimer, the term of this patent is extended or adjusted under 35 U.S.C. 154(b) by 72 days.

(21) Appl. No.: 16/829,530

(22) Filed: Mar. 25, 2020

(65) Prior Publication Data
US 2021/0299578 A1    Sep. 30, 2021

(51) Int. Cl.
*A63F 9/24* (2006.01)
*G06F 15/16* (2006.01)
*A63F 13/795* (2014.01)
*H04W 4/12* (2009.01)
*G06K 9/62* (2022.01)

(52) U.S. Cl.
CPC .......... *A63F 13/795* (2014.09); *G06K 9/6221* (2013.01); *H04W 4/12* (2013.01); *A63F 2300/537* (2013.01); *A63F 2300/556* (2013.01)

(58) Field of Classification Search
None
See application file for complete search history.

(56) References Cited

U.S. PATENT DOCUMENTS

| 2005/0192097 A1* | 9/2005 | Farnham | A63F 13/795 463/42 |
| 2006/0121990 A1* | 6/2006 | O'Kelley, II | A63F 13/35 463/42 |
| 2007/0149290 A1* | 6/2007 | Nickell | A63F 13/12 463/42 |
| 2009/0075738 A1* | 3/2009 | Pearce | A63F 13/79 463/42 |
| 2012/0094762 A1* | 4/2012 | Khan | A63F 13/795 463/42 |
| 2012/0142429 A1* | 6/2012 | Muller | A63F 13/35 463/42 |
| 2014/0274362 A1* | 9/2014 | Dhawan | A63F 13/795 463/29 |

(Continued)

*Primary Examiner* — Lawrence S Galka
(74) *Attorney, Agent, or Firm* — Lee & Hayes, P.C.

(57) ABSTRACT

A game management system identifies gaming data associated with online game players and determines, based at least in part on the gaming data, other players to recommend as friends for playing an online game. Gaming data from online games other than the online game for which friend recommendations are to be made may be used to provide the friend recommendations. A subset of categories of the gaming data may be used to initially bin the plurality of players into separate bins. Similarity of players, with respect to their gaming data, or a subset thereof, within each bin may be determined. This similarity analysis may result in a similarity score corresponding to each pair of players within a bin. The similarity scores may be used to determine if two players are compatible from an online gaming standpoint and provide friend recommendations to players.

20 Claims, 8 Drawing Sheets

(56) References Cited

U.S. PATENT DOCUMENTS

| | | | |
|---|---|---|---|
| 2015/0148136 A1* | 5/2015 | Olofsson | A63F 13/30 463/42 |
| 2016/0026669 A1* | 1/2016 | Honda | A63F 13/79 707/749 |

* cited by examiner

FRIEND RECOMMENDATIONS FOR ONLINE VIDEO GAME PLAYERS

BACKGROUND

Online gaming allows players to play a variety of electronic and/or video games with each other via network connectivity, such as via the Internet. Players often play these online games with their friends. However, for various reasons, players may not have online friends with whom they can have an established and continuous relationship to play these online games and/or may not know who to befriend. For example, if a particular player wishes to play a new online game (e.g., an existing online game with minimal or no gameplay data available, or a recently released game), then the player may not have established friends or friend relationships for playing that new game and/or may not know who to befriend for the purposes of that particular game. In general, not having friends or leads to potential and optimal friends with whom to play the online games may diminish the player's enjoyment and/or quality of experience. Additionally, it may be difficult to find friends online to play these types of online games, as different players may have different playing schedules and/or different gaming interests.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
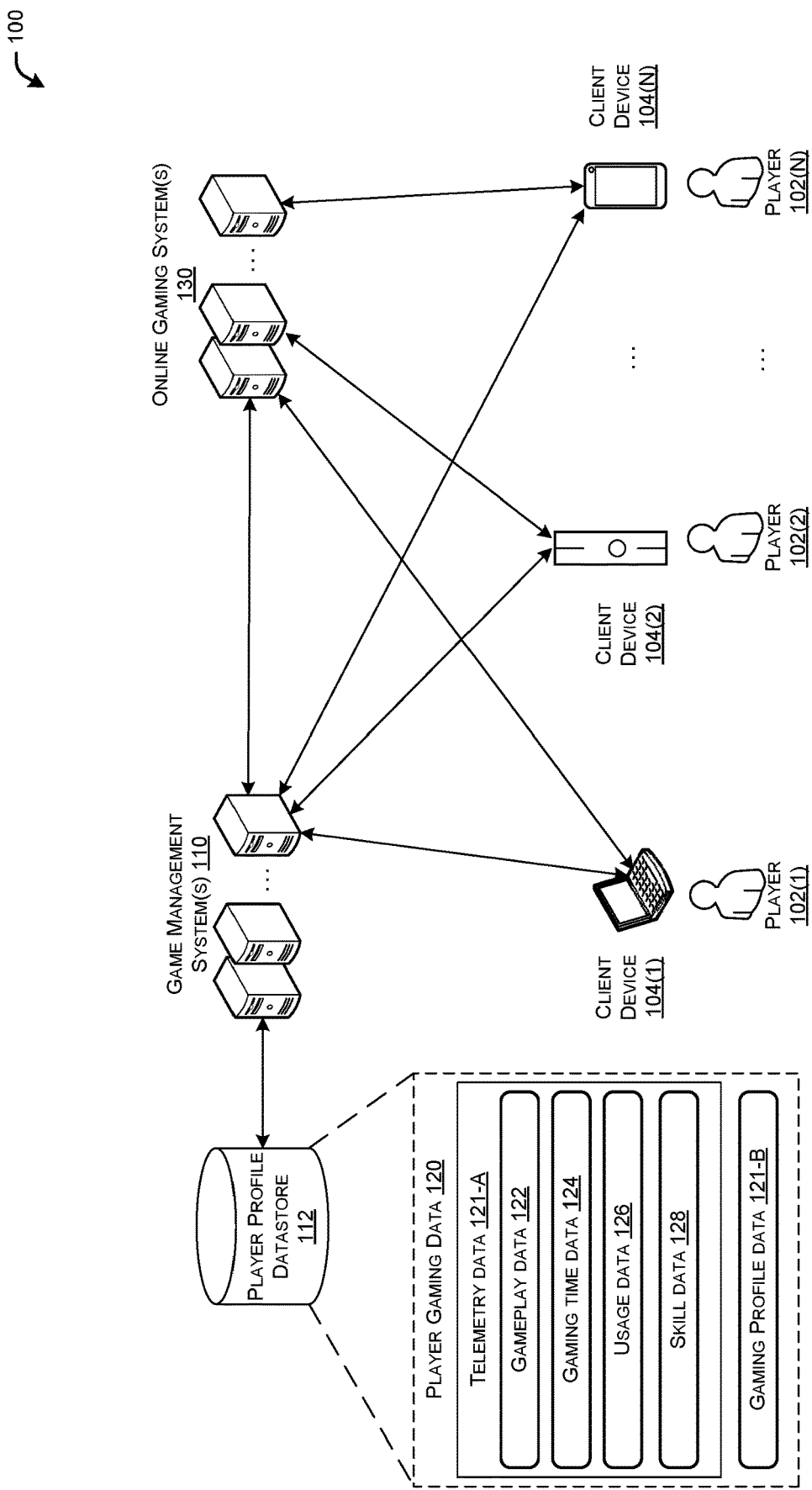
FIG. 1 illustrates a schematic diagram of an example environment with online gaming system(s) and game management system(s) to provide friend suggestions to player(s) for online gaming, in accordance with example embodiments of the disclosure.

Example embodiments of this disclosure describes methods, apparatuses, computer-readable media, and system(s) for suggesting and/or providing friends with whom one can play online games. In example embodiments of the disclosure, players who play an online game may wish to play an online game where those players may not have any or enough established friends with who to play the online game. Not having friends to play the online game with may generally reduce the enjoyment derived by a player when playing the online game. Additionally, the player may be less engaged when playing the online game without any friends. As a result, according to example embodiments of the disclosure, a game management system may use a variety of information associated with the player, as well as information associated with other players, to suggest player(s) as potential friends to the player who does not have any friends and/or has an insufficient number of friends with whom to play the online game. Therefore, the general user experience and/or engagement associated with online gaming may be improved by the mechanisms disclosed herein.

According to example embodiments of the disclosure, a group of players may be provided with recommendations for friends for playing an online game based at least in part on characteristics of those players in playing the same and/or other online games. The characteristics of the players, as embodied as the players' gaming data, may be used as parameters for matching of players when making recommendations of friends for online gaming. For example, the times and/or days when players play online games, the genres of online games played by the players, and/or the players' skill level may be considered in making friend recommendations.

As used herein, a "friend" refers to a player with which another player has a virtual association or relationship that can persist beyond single games or matches, sessions, and over a period of time. That is, friends and friend relationships differ from relationships (e.g., opponents) that are made for a specific match, instance or session of a game, at least because a friend relationship established during one session can still exist during another future session. By virtue of such friend relationships, players can play with or against player-friends over time rather than with or against random players.

In some cases, the players for whom a recommendation of friend(s) is to be made may be new to playing the particular online game for which the friend recommendation is to be made. It should be understood that the online game can be (1) a new game, for which telemetry data is not yet available or not yet sufficiently available for most or all players, or (2) an existing game for which telemetry data is not yet available or not yet sufficiently available for one or more of the players to whom friend recommendations are to be made. In some embodiments, playing a new game or an existing game for the first time is referred to as "cold starting" (or a "cold start"). In these cases, the players' telemetry data associated with online game(s) other than the one for which the friend recommendation is to be made may be used to determine friend recommendations. This telemetry data of the players across one or more online games may be stored in connection with one or more respective player profiles associated with and/or virtually representing each of the players.

One or more game management system(s) may cooperate with one or more other entities, such as online gaming system(s) and/or client devices on which players play the online games, to determine and make recommendations of friends to individual players. The game management system(s) may obtain, manage, store, and/or retrieve various player gaming data, including telemetry data and gaming profile data, for individual players and store that data in connection with player profiles that correspond to and/or virtually represent respective players. The telemetry data's parameters and corresponding values may embody any suitable information derived from a player's interaction and/or behavior with video games, which may be used to provide friend recommendations to players of the online games. For example, a player's telemetry data may include information about the days of the week when the player plays particular online games, the types (e.g., genres) of online games played by the player, the frequency (e.g., number of sessions over a period of time, number of hours played in the last month, etc.), skill level of the player in one or more online games, player selected preferences, or the like. The player's gaming profile data can include information input and/or provided by the player, such as demographic information, location information, platform information, player chosen preferences, or the like.

The game management system(s) may access information associated with individual players to bin players according to a subset of their player gaming data. For example, players may be separated into different bins according to the days of the week when they play online games and the genres (e.g., battle royale, first person shooter, sports, etc.) of games played. In other examples, the players may be separated into different bins according to the frequency of gameplay, player skill in a particular online game, and the player's age. In yet other examples, the players may be separated into different bins according to the client devices (e.g., systems) used by the players. In fact, according to example embodiments of the disclosure, the players for whom a friend recommendation is to be made may be separated into different bins according to any number of suitable player gaming data categories and/or parameters. In example embodiments, the players may be binned according to one or more gaming categories and values thereof using any suitable technique, such as clustering, archetypal analysis, similarity analysis, combinations thereof, or the like. The process of binning the players may use a range of archetypal analysis and/or clustering metrics on any suitable scale (e.g., 0 to 100, −1 to 1, etc.).

The game management system(s) may further be configured, according to example embodiments of the disclosure, to perform a similarity analysis of various gaming data associated with individual players. This similarity analysis may be performed in a pairwise manner between pairs of players who have been binned together according to a subset of gaming data categories. For example, a bin may contain three players (player A, player B, and player C) and a similarity score may be determined between each pair of players (e.g., similarity between player A and player B, similarity between player A and player C, and similarity between player B and player C). The similarity metric (e.g., similarity score) may be used for determining one or more friend recommendations for each of the players.

The similarity score between pairs of players may be performed by any suitable manner, according to embodiments of the disclosure. The game management system(s) may determine a vector and/or matrix of values associated with gaming categories and/or parameters corresponding to individual players. This vector having gaming data may then be used to find a similarity score between any two players for whom friend recommendations are to be made. The similarity score may be determined by any suitable mechanism, such as Pearson correlation, cosine similarity, determining a dot product of vectors being compared, determination of a covariance, linear regression analysis, combinations thereof, or the like. The similarity scores may be on any suitable scale (e.g., −1 to 1, 0 to 100, etc.). For example, the similarity score may be a Pearson correlation on a decimal scale between −1 and 1, where a score of −1 indicates perfect inverse linear correlation, a score of 1 indicates perfect direct linear correlation, and a score of zero indicates no linear correlation between the two players being compared.

The game management system(s) may use similarity scores between pairs of players in any suitable manner to provide friend recommendations. In some aspects, friend recommendations may be made to two players who have a similarity score that meets a threshold condition. For example, a Pearson similarity correlation threshold may be set at 0.7 and if two players have a Pearson similarity score of their respective gaming data, or subset thereof, greater than this threshold, then the game management system(s) may determine that the two players are to be provided with a friend recommendation of each other. Other suitable mechanisms may include making friend recommendations to a player with a predetermined number of other players with whom that player may have the greatest level of similarity, as determined by the similarity score. For example, the game management system(s) may be configured to provide a player with three friend recommendations. In this case, the player may be provided with three friend recommendations corresponding to three other players with whom the player has the greatest cosine similarity of his or her gaming data used for evaluating similarity scores. It should be appreciated that the similarity metrics (e.g., Pearson correlation, cosine similarity, etc.), the thresholds (e.g., 0.7 Pearson threshold, three friend recommendations, etc.), or any other parameters are examples. Indeed, any variety of similarity metrics, thresholding, predetermined number of friend recommendations, related parameters, combinations thereof, or the like may be used for the purposes of selecting players to provide as friend recommendations.

It should be noted that mechanisms, as disclosed herein, may be applied to any variety of online gaming. For example, the disclosure herein may apply to non-streaming players and/or streaming players who play from any variety of client devices/platforms. Streaming players, for example, may play online games (e.g., the online game for which a friend recommendation is to be made) using a streaming client device on which the current state of the online game may be presented to the streaming players. This presentation may include any variety of content, such as video, audio, haptics, or any other suitable rendered output that represents the current state of the online game and can be perceived by the player. The streaming client device may receive the content to be presented to the streaming player from one or more online gaming system(s) configured to stream online games. Thus, the content of the online game, for the streaming player, may be rendered at the one or more online gaming system(s) and streamed to the streaming player's streaming client device for presentation to the streaming player. Additionally, non-streaming players may also be provided with friend recommendations according to the mechanisms disclosed herein.

It should be appreciated that the mechanisms as disclosed herein may be applied to solve technological problems in the field of online gaming. For example, the systems and methods, as disclosed herein, result in increased engagement of online gamers and overall improvement in the gaming experience. In example embodiments, a player who is playing with friends, according to the mechanisms described herein, may be more engaged with the game and may be more engaged with his or her friends, as recommended by the embodiments of this disclosure.

Additionally, the mechanisms, as described herein, not only provide improvements in the field of online gaming, but also provide improvements in the use of computing resources. For example, the mechanism for providing friend suggestions may be computer resource efficient. By performing a clustering/binning process according to a subset of player gaming data prior to a more complete pairwise similarity analysis within bins, the pairwise similarity analyses may be performed between players that are more likely to result in a positive match, resulting in improved computational efficiency. Thus, the disclosure herein results in improvements in the field of online gaming, as well as improved efficiency and use of computational and/or computer networking resources for the purposes of suggesting friends for online gaming. Increased efficiency of computing resources (e.g., processing bandwidth, networking resources, etc.) realized via the disclosure herein can be used to provide gaming services to a greater number of people, than would otherwise be possible.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with online gaming system(s) 130 and game management system(s) 110 to provide friend suggestions to player(s) 102(1), 102(2), . . . 102(N) for online gaming, in accordance with example embodiments of the disclosure. The player(s) 102(1), 102(2), . . . 102(N), hereinafter referred to individually or collectively as player(s) 102, may interact with respective game client device(s) 104(1), 104(2), . . . 104(N), hereinafter referred to individually or collectively as game client device(s) 104 to play online game(s) hosted by online gaming system(s) 130.

The player(s) 102 may be either streaming players 102 or non-streaming players 102. The non-streaming players may play using client devices 104 that locally render the game to respective players 102. For streaming players 102 rendered game content may be provided to client devices 104 of the players 102 by the online gaming system(s) 130 and/or associated streaming systems. The mechanisms as described herein may be applied to either or both streaming and/or non-streaming players 102.

The game client devices 104 may be configured to render content associated with the online game to respective players 102. This content may include video, audio, haptic, combinations thereof, or the like content components. The game client device(s) 104 may receive game state information from the one or more online gaming system(s) 130 that may host the online game played by the player(s) 102 of environment 100. The game client device(s) 104 may use the game state information to render current events of the online game as content. The game state information may be received repeatedly and/or continuously and/or as events of the online game transpire. The game state information may be based at least in part on the interactions that each of the player(s) 102 have via their input device(s) associated with their client device(s) 104 responsive to events of the online game hosted by the online gaming system(s) 130.

As events transpire in the online game, the online gaming system(s) 130 may update game state information and send that game state information to the game client device(s) 104. For example, if the players 102 are playing an online soccer game, and the player 102 playing one of the goalies move in a particular direction, then that movement and/or goalie location may be represented in the game state information that may be sent to each of the game client device(s) 104 for rendering the event of the goalie moving in the particular direction. In this way, the content of the online game is repeatedly updated throughout game play. When the game client device(s) 104 receives the game state information from the online gaming system(s) 130, the game client device(s) 104 may render updated content associated with the online game to its respective player 102. This updated content may embody events that may have transpired since the previous state of the game (e.g., the movement of the goalie).

The game client device(s) 104 may accept input from respective players 102 via respective input device(s) of the client device 104, such as joysticks, touch screens, gamepads, or the like. The input from the players 102 may be responsive to events in the online game. For example, in an online basketball game, if a player 102 sees an event in the rendered content, such as an opposing team's guard blocking the paint, the player 102 may provide input to his/her client device 104 to try to shoot a three-pointer. Intended action by the player 102, as captured via input devices of the client devices 104 may be sent to the online gaming system(s) 130.

The game client device(s) 130 may be any suitable device, including, but not limited to a Sony Playstation® line of systems, a Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to interact with the online gaming system(s) 130 and render game content based at least in part on game state information received from the online gaming system(s) 130. Additionally, the client device(s) 104 may send indications of player input to the online gaming system(s) 130. Game state information and player input information may be shared between the client device(s) 104 and the online gaming system(s) 130 using any suitable mechanism, such as application program interfaces (APIs).

The online gaming system(s) 130 may receive inputs from various players 102 and update the state of the online game based thereon. As the state of the online game is updated, the state may be sent the various client device(s) 104 for rendering online game content to players 102. In this way, the online gaming system(s) 130 host the online game. As described herein, in some cases, the online gaming system(s) 130 and/or associated system(s), such as a streaming system (not shown), may provide streaming content to one or more of the client devices 104, when the associated players 102 play in streaming mode. The streaming players 102 may experience (e.g., view, hear, feel, etc.) the content associated with the online game on their client devices 104 based at least in part on streaming content as received from the online gaming system(s) 130.

The game management system(s) 110, according to example embodiments, may be configured to provide game management services, such as game selection, player pairing, player profile management, and/or friend recommendation services. The game management system(s) 110 may be configured to interact with players 102 via their respective client devices 104 for the purposes of selecting online games to play, pairing players (e.g., finding other players with whom to play an online game, etc.), or the like. To this end, the game management system(s) 110 may manage, among other things, information about or derived from the gameplay of players 102 that facilitate the players 102 playing one or more online games, such as online games hosted by the online gaming system(s) 130.

The game management system(s) 110 may receive, manage, and/or access, for example, gameplay or telemetry information associated with each of the players 102 who wish to play online game(s). This information may be stored and/or accessed by the game management system(s) 110 in a player gaming datastore 112. That is, the data may be stored as player gaming data 120 corresponding to respective players 102 (and/or their player profiles). The player gaming data 120 may include any variety of telemetry data 121-A known to those of skill in the art, such as gameplay data 122, gaming time data 124, usage data 126, skill data 128, combinations thereof, or the like; and/or any variety of gaming profile data 121-B. According to example embodiments, the parameters and values, as stored and available in the player gaming data 120 may be used to provide friend recommendations to players 102 of the online games.

The gameplay data 122 of a player's player gaming data 120 may indicate a variety of gameplay related information about the corresponding player 102. For example, the gameplay data 122 may include data related to which games and/or which types (e.g., genres) of online games are played by the player 102. The gameplay data 122 may also indicate what percentage of a player's gameplay is directed to various genres and/or games. Further still, the gameplay data may show a player's progression of interest in various games and/or genres. For example, the gameplay data may indicate that a particular player 102 may have been 70% engaged in battle royale genre and 30% engaged in sports genre 6 months ago, but now is 25% engaged in battle royale, 10% engaged in sports, and 35% engaged in real time strategy, and 30% simulation. The games indicated in a player gaming data 120 may be any suitable game including, but not limited to, games that are managed by the game management system(s) 110 and/or hosted by the online gaming system(s) 130. The genres of games may be of any suitable granularity or generality. For example, game genres indicated in a player's player gaming data 120 may include one or more of battle royale, shooter games, first person shooter, strategy, turn-based strategy, real-time strategy, action, fighting, stealth, sports/esports, racing, survival, book/movie based games, simulation, life simulation, building simulation, civilizational simulation, wargames, board games, scientific games, science fiction games, logic games, party games, music/dance/rhythm games, combinations thereof, or the like.

In some example embodiments, gameplay data 122 may also include hardware, software, input device, and/or demographical information about a corresponding player 102. For example, the player gaming data 120 may indicate the type of client device(s) 104 which the corresponding player 102 uses for playing online games. In some examples, the player gaming data 120 may indicate the type of input devices (e.g., touch screen, joystick, motion detector, camera, mouse, etc.) which the corresponding player 102 uses for playing online games. Further still, in some examples, the player gaming data 120 may indicate the network speeds (e.g., latency, bandwidth, etc.) available to the corresponding player 102 for playing online games. In yet other example embodiments, the player gaming data 120 may indicate the location, language, in-game communications usage metric(s), percentage of toxic communications, streaming or non-streaming use, and/or other preferences/characteristics of the corresponding player 102.

The gaming time data 124 of a player's player gaming data 120 may indicate a variety of gameplay time related information about the corresponding player 102. In example embodiments, gaming time data 124 of a player 102 may include information about the days of the week when the player plays particular online games, the times when he or she plays (e.g., after 5 PM Eastern Standard Time), play times on holidays, etc. In some cases, where the player plays a variety of games or genres of games, the gaming time data 124 may include historical and/or projections of gaming times by games played and/or genres of games played. Indeed, the gaming time data 124 within player gaming data 120 of a player 102 may include any variety of descriptive information about a player's historical and/or projected times of online game play with any suitable level of granularity and/or generalization.

The usage data 126 of a player's player gaming data 120 may indicate a frequency (e.g., number of sessions over a period of time, number of hours played in the last month, number of different games played over the last year, etc.) of gameplay by a player 102. In some cases, the usage may be indicated by title of online game played and/or by the genre of online games played. Indeed, the usage data 126 within player gaming data 120 of a player 102 may include any variety of descriptive information about a player's historical and/or projected frequency of playing one or more online games with any suitable level of granularity and/or data aggregation. The usage data 126 may further indicate player chosen preferences, where the player 102 provides online game playing information about himself or herself. For example, a player 102 may indicate whether he or she wishes to play for fun/casually or play competitively. As a result, such player specified preferences may be used in determining friend recommendations, as described herein. The player chosen preferences may further be modified by the player 102 over time. Continuing with the previous non-limiting example, the player 102 may indicate at a first time that he or she wishes to play for fun and then at a later time indicate that he or she wishes to play competitively.

The skill data 128 of a player's player gaming data 120 may indicate a variety of gameplay skill related information about the corresponding player 102. A player 102 may have one or more skill score(s) corresponding to his or her skills in one or more games and/or genres of games. These skill scores may be indicative of a player's past performance and/or an expectation of future performance on one or more online games. As with any other player gaming data 120 based data, the data in the skill data 128 of the player gaming data 120 may update over time. The skill data 128 within a player profile 120 of a player 102 may include any variety of descriptive information about a player's historical and/or projected skill in playing one or more online games and may be provided with any suitable level of granularity and/or skill data aggregation.

The gaming profile data 121-B may include any variety of information defining a player. In many cases, the gaming profile data 121-B may include player provided data, such as data that a player 102 provides to the game management system(s) 110 or any other entity of the environment 100. Examples of the gaming profile data may include, but is not limited to, user name, profile name, identity information, location, gender, age, friends, client device 104 platform type, combinations thereof, or the like. In some cases, the gaming profile data 121-B may be provided by the corresponding player 102 when setting up an account for online gaming. As discussed herein, the gaming profile data 121-B, as well as the telemetry data 121-A corresponding to a plurality of players 102 may be used for making friend recommendations to the players 102.

Although a particular separation of gaming data as stored in and/or accessed from player gaming data 120 is discussed herein, it should be appreciated that this type of gaming data may be stored and/or used in any suitable format. For example, the player gaming data 120 may include all, some, or variations to the gaming data categories as discussed herein. Categories and data types other than the gaming data organized as the gameplay data 122, the gaming time data 124, the usage data 126, and/or the skill data 128 associated as the player gaming data 120 are contemplated, according to example embodiments of the disclosure.

The game management system(s) 110 may be configured to store and then later access information about individual players, such as from the player's player profiles 120 to generate recommendations for friends for online game(s). The game management system(s) 110 may be configured to receive player related gaming data from any suitable source, such as the online gaming system(s) 110 and/or client devices 104. For example, the game management system(s) 110 may receive information about how long and on what day or time a particular player 102 played a particular online game hosted by the one or more gaming system(s) 130. The game management system(s) 110 may then take this information and use it to update the player's player gaming data 120, as stored on the player profile datastore 112. In this way, as new information about player(s) 102 are obtained by the game management system(s) 110, the game management system(s) may use the information to update associated player gaming data 120. In some cases, updating player gaming data 120 may entail storing data received by the game management system(s) 110, such as storing information of which online game was played by a player 102. In other cases, the received data may be used to update a parameter or metric of a corresponding set of player gaming data 120, such as receiving a score on a particular online game played by a player and using that score to update skill data 128 associated with the player 102 as part of his or her player gaming data 120.

According to example embodiments, the one or more game management system(s) 110 may be configured to determine whether a player 102 is to be provided with a friend recommendation for playing a particular game. There may be a variety of mechanisms for making this determination. For example, if the player 102 has not been playing with any or enough friends, then it may be determined that the player 102 is to be provided with friend recommendation(s) for playing the online game. As another example, the game management system(s) 110 may determine that a particular player 102 may recently (e.g., within a threshold time or threshold number of play session) be engaging with a particular game. Thus, the player 102 may be new to playing the game and may not have yet established friends to play with. In this case, the game management system(s) 110 may determine that the player 102 is to be provided with friend suggestion(s).

When a player 102 or a group of players 102 are to be provided with friend recommendations, any subset or all of the gaming data as stored as player gaming data 120 may be used for the purposes generating friend recommendations. In example embodiments, players for whom a friend recommendation is to be made may be binned according to a subset of player gaming data. For example, players may be separated into different bins according to their frequency of gameplay and the genres (e.g., battle royale, first person shooter, sports, etc.) of games played. This gaming data (e.g., frequency of gameplay and genres) may be accessed by the game management system(s) 110 as the player gaming data 120 corresponding to each of the players 102 who are to be binned. It should be understood that the example of binning based on frequency of game play and genres are non-limiting, and in example embodiments, the players may be binned according to any one or more gaming data categories and values thereof.

The process of binning may be performed using any suitable technique, such as clustering, archetypal analysis, similarity analysis, combinations thereof, or the like. The process of binning the players may use a range of clustering metrics on any suitable scale (e.g., −100 to 100, −1 to 1, 0 to 10, etc.). In archetypal analysis, unsupervised learning may be performed using the categories (e.g., gameplay days of the week and frequency of gaming) selected for binning. The separation of players 102 into bins may be performed by fitting each player 102 to a combination of archetypes. Minimization procedures may be used to reduce the error of the fit. Thus, archetypal analysis may produce results where the players are separated into different bins according to the categories selected for binning. Alternatively, a clustering analysis may be performed by the game management system(s) 110 to bin players 102 using any suitable clustering algorithm (e.g., k-means, density-based, distribution-based, etc.).

The game management system(s) 110 may further be configured, according to example embodiments of the disclosure, to perform pairwise similarity analysis of various gaming data associated with individual players who have been binned together according to a subset of gaming data categories. The gaming data used for this similarity analysis may be accessed by the game management system(s) from the player gaming data 120 stored in the player profile datastore 112. In some cases, the gaming data categories used for the similarity analysis may include one or more of the gaming data categories used for binning the players 102. In other cases, the gaming data categories used for the similarity analysis may exclude the gaming data categories used for binning the players 102. The pairwise similarity analysis may generate a similarity score between any two players 102, based at least in part on their respective gaming data, as stored in their player gaming data 120.

The similarity score between pairs of players 102 may be performed by any suitable manner, such as Pearson correlation, cosine similarity, determining a dot product of vectors being compared, determination of a covariance, linear regression analysis, combinations thereof, or the like. The result of a pairwise similarity analysis may be a similarity score between the two players 102 being compared. After generating the similarity scores between pairs of players 102, friend recommendations may be made to the players 102 based at least in part on those similarity scores. By first binning the players 102 and performing similarity analysis between players 102 within bins, fewer pairwise similarity analyses will be needed for determining friend recommendations. Thus, the process of determining potential friends for the players 102 may be computationally tractable by using the mechanisms disclosed herein.

The game management system(s) 110 may use similarity scores between pairs of players in any suitable manner to provide friend recommendations. For example, a thresholding mechanism may be used where if a similarity score between two players 102 is within a threshold level (e.g., greater than 70%, greater than 0.8, depending on the scale, etc.) then the two players 102 may be recommended to each other as friends. Other mechanisms may include providing a predetermined number of friend recommendations based on the greatest similarity scores.

In some cases, the game management system(s) 110 may provide a platform for the players 102, such as with recommended friends, to interact in a safe and anonymous way. This communication may entail text-based and/or voice-based communications. The players 102 can determine if they want to try playing together using the game management system(s) 110. In some cases, the game management system(s) 110 may be configured to instantiate the online game on the online gaming system(s) 130 between a player 102 and one or more other player(s) 102 who were recommended as friend(s). In some cases, the game management system(s) 110 may further be configured to determine if a player 102 and his or her recommended friend(s) are online at the same time, and if so, the game management system(s) 110 may be configured to determine if the players 102 wish to play the online game for which they were recommended to befriend each other together. Responsive to an affirmative response from both players 102, the game management system(s) 110 may be configured to instantiate the online game between the two players 102. Instantiating the online game may entail providing the online gaming system(s) 130 an indication that the two players 102 wish to play the online game together.

Figure 2:
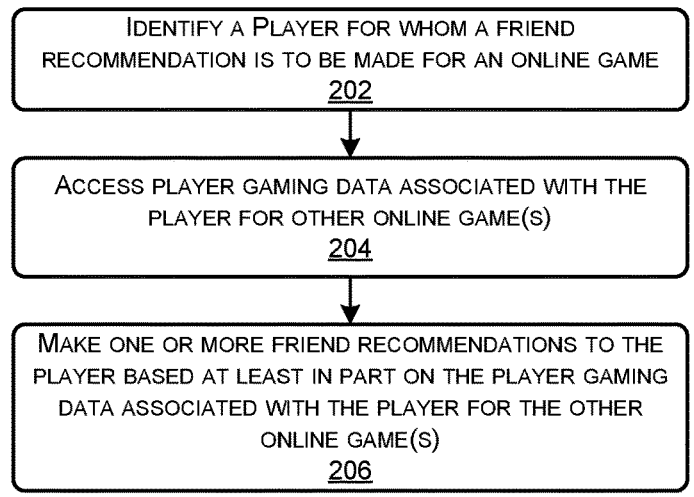
FIG. 2 illustrates a flow diagram of an example method to provide a player with a friend recommendation for playing an online game, in accordance with example embodiments of the disclosure.

FIG. 2 illustrates a flow diagram of an example method 200 to provide a player 102 with a friend recommendation for playing an online game, in accordance with example embodiments of the disclosure. Method 200 may be performed by the game management system(s) 110, individually or in conjunction with one or more other entities of environment 100.

At block 202, a player for whom a friend recommendation is to be made for an online game may be identified. According to example embodiments, there may be a variety of mechanisms for determining whether a player 102 is to be provided with a friend recommendation. For example, if the player 102 has not been playing with any or enough friends, then it may be determined that the player 102 is to be provided with friend recommendation(s) for playing the online game. As another example, the game management system(s) 110 may determine that a particular player 102 may be relatively new to a particular game and is, therefore, to be provided with a friend recommendation. For example, if a player 102 plays an online game that is new to him or her for the first time or the second time or first few times, the game management system(s) 110 may determine that the player 102 is to be provided with one or more friend recommendation(s).

At block 204, player gaming data associated with the player may be accessed. The player gaming data 120 may be accessed from the player profile datastore 112. The player gaming data 120 may include a variety of gaming data, as discussed herein, including, for example, days of the week when the player 102 plays online games, genres of game played by the player 102, number of sessions played by the player 102, skill levels of the player 102 on various games, player chosen preferences, any variety of telemetry data 121-A, any variety of gaming profile data 121-B, or the like. It should be understood that in some cases, the processes of block 204 may precede the processes of block 202, and the gaming data included in the player gaming data 120 may be used to make a determination of whether the player 102 is to be provided with friend recommendations. It should be noted that in some cases, the gaming data in the player gaming data 120 may include gaming data associated with the online game for which a friend recommendation is to be made. In other cases, the player gaming data 120 may only include gaming data from online games different from the online game for which the friend recommendation is to be made.

At block 206, one or more friend recommendations may be made to the player based at least in part on the player gaming data associated with the player for the other online game(s). These friend recommendations may be determined based at least in part on the gaming data in the player gaming data 120, as well as player gaming data 120 of other players 102. Thus, gaming data from online game(s) other than the online game for which a friend recommendation is to be provided may be used to generate the friend recommendation. In other words, according to example embodiments, gaming data from one or more online games may be collected and used for the purposes of making a friend recommendation in a different online game.

In some cases, the friend recommendations for the player 102 may be sent to the player's client devices 104. The client devices 104 may display the friend recommendation(s) to the player 102. At this point, the player 102, via his or her client device 104 and/or the game management system(s) 110, may choose to interact with one or more of the player(s) 102 that were recommended as friend(s). Additionally, in example embodiments, recommended friend(s) may be stored associated with a player 102, such as in the player's player gaming data 120.

In example embodiments, the game management systems(s) 110 may be able to facilitate communications between the player 102 and one or more other player(s) 102 who were recommended to the player 102 as potential friend(s). This communication may entail text-based and/or voice-based communications. The game management system(s) 110 may further instantiate an online game between the player 102 and one or more other player(s) 102 who were recommended as friend(s) to the player 102. In some cases, the game management system(s) 110 may check if a player 102 and his or her recommended friend are online at the same time, and if so, the game management system(s) 110 may ask the players 102 if they wish to play the online game together. Responsive to an affirmative response from both players 102, the game management system(s) 110 may instantiate the online game between the two players 102. Instantiating the online game may entail providing the online gaming system(s) 130 an indication that the two players 102 wish to play the online game together.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
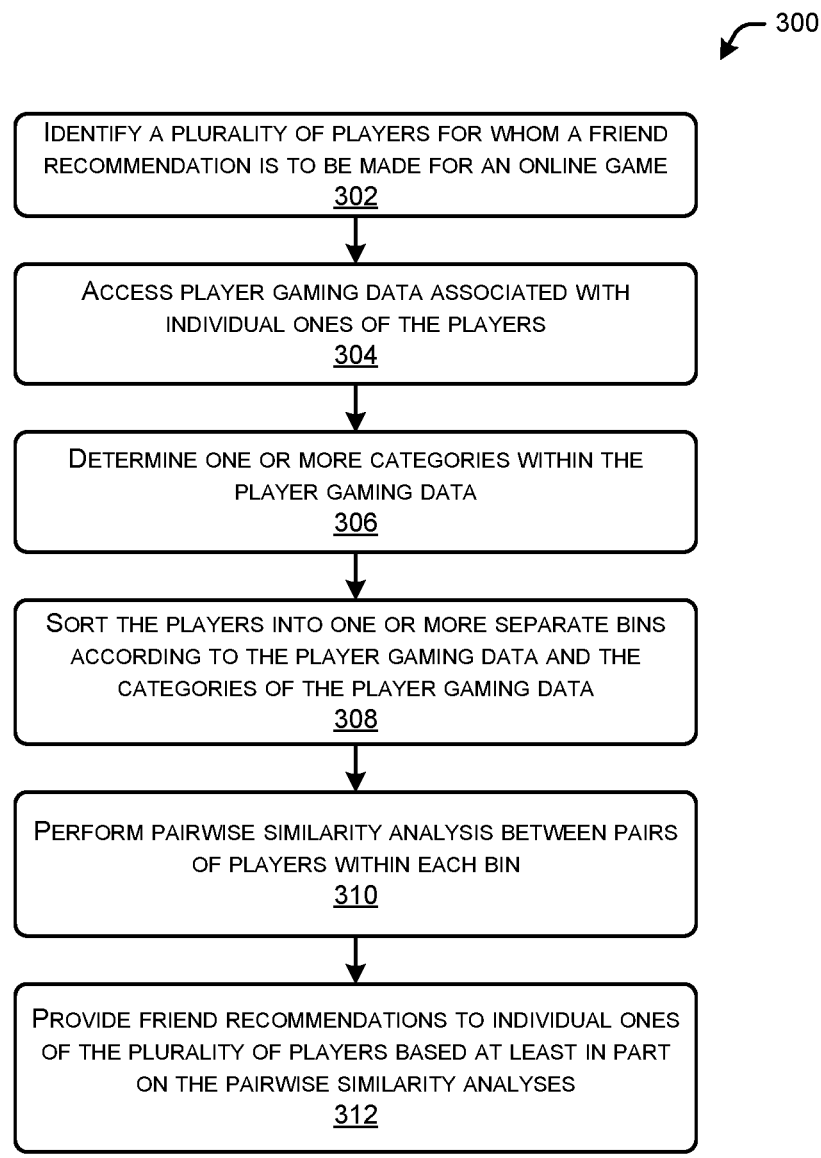
FIG. 3 illustrates a flow diagram of an example method by which a plurality of players may be provided with friend recommendations from among the plurality of players, in accordance with example embodiments of the disclosure.

FIG. 3 illustrates a flow diagram of an example method 300 by which a plurality of players 102 may be provided with friend recommendations from among the plurality of players 102, in accordance with example embodiments of the disclosure. Method 300 may be performed by the game management system(s) 110, individually or in conjunction with one or more other entities of environment 100.

At block 302, a plurality of players for whom a friend recommendation is to be made for an online game may be identified. According to example embodiments, there may be a variety of mechanisms for determining whether players 102 are to be provided with a friend recommendation. In some cases, if a player 102 does not have a certain number of friends deemed to be adequate, friends may be recommended to him or her, according to the mechanisms disclosed herein. In other cases, if a player 102 is new to an online game (e.g., playing for the first time or first several times), then it may be determined that the player 102 is to be provided with friend recommendation(s). In yet other cases, if a player's current friends are determined to be a poor fit, then it may be determined that that player 102 is to be provided with new friend recommendations. The current players 102 may be a poor fit if, for example, the players 102 generally play online games at different times of the day or on different days of the week. Other reasons for a poor friend fit may include, for example, a significant mismatch in skill levels between two players 102. Although specific examples of how it may be determined that a player 102 is to be provided with a friend recommendation is discussed here and elsewhere in this disclosure, it should be noted that there may be any number of ways to determine that a friend recommendation is to be made and based on any suitable data.

At block 304, player gaming data associated with individual ones of the players may be accessed. The player gaming data 120 may be accessed from the player profile datastore 112. Player gaming data 120 of individual players 102, as accessed, may include a variety of gaming data, as discussed herein, including, for example, days of the week when the corresponding player 102 plays online games, genres of game played by the player 102, number of sessions played by the player 102, skill levels of the player 102 on various games, player chosen preferences, any variety of telemetry data 121-A, any variety of gaming profile data 121-B, or the like. It should be understood that in some cases, the processes of block 304 may precede the processes of block 302, and the player gaming data 120 may be used to make a determination of whether players 102 are to be provided with friend recommendations.

It should be noted that in some cases, the player gaming data 120 may include gaming data associated with the online game for which a friend recommendation is to be made. In other cases, the player gaming data 120 may only include gaming data from online games different from the online game for which the friend recommendation is to be made.

At block 306, one or more categories within the player gaming data may be determined. These categories may be the types of player gaming data 120. For example, the categories may be an indicator of the days of the week when a player 102 plays online games, an indicator of the number of days played in the past month, the genres of games played, or the like.

At block 308, the players may be sorted into one or more separate bins according to the player gaming data and the categories of the player gaming data. In example embodiments, one or more categories may be chosen (e.g., days of the week for gaming and skill level in shooter games) for the purposes of binning the players. In some cases, a clustering mechanism may be used for binning. For example, distance-based clustering may be used for determining which players 102 are placed in which bin. In this type of process, the values for each player 102 in the categories selected for binning may be used for finding distances between players. These distances may then be used to find clusters of players 102 and each cluster may be designated a bin with its respective players 102. Binning may alternatively be performed by archetypal analysis, as has been discussed herein. In some cases, the binning process may be unsupervised and/or minimally supervised. In other cases, a human or machine operator may guide the archetypal analysis, such as by setting parameters, such as the number of bins.

At block 310, pairwise similarity analysis may be performed between pairs of players within each bin. A vector, matrix, and/or any suitable data structure of gaming data may be generated for each of the players 102 for whom similarity analysis is to be performed. The vector may include values of each category of data that is to be used for the similarity analysis. In some cases, this vector of gaming data may include the gaming data that was used in the binning process, and in other cases, the vector of gaming data may exclude one or more of the categories, and associated values, of the categories used in the binning process.

After generating a vector of values corresponding to each of the players 102, a similarity score may be determined between pairs of vectors of gaming data. The similarity score may be indicative of the compatibility of the two players 102 to whom the similarity score corresponds. For example, a pair of players 102 with a greater similarity score may be more compatible as friends, for the purpose of online gaming, compared to another pair of players 102 who might have a lower similarity score.

As described herein, the similarity scores between pairs of players 102 may be determined by any suitable mechanism using the vectors of gaming data corresponding to each of the pair of players 102. For example, the similarity score between any two vectors of gaming data may be determined by any one or more of Pearson correlation, cosine similarity, determining a dot product of the gaming data vectors, determination of a covariance, linear regression analysis, or the like. Indeed, the similarity score may be determined by any suitable mechanism that allows a quantitative determination of the similarity between the two vectors of gaming data. The similarity scores may be on any suitable scale (e.g., −1 to 1, 0% to 100%, etc.).

At block 312, friend recommendations may be provided to individual ones of the plurality of players based at least in part on the pairwise similarity analyses. The similarity scores between two players 102 may be compared to a threshold level to determine whether the two players 102 are to be recommended to each other as friends. For example, a Pearson similarity threshold level may be set at 0.75 and if two players 102 have a Pearson similarity score of their respective vectors of gaming data that meets this threshold level, then the two players 102 may be recommended to each other as friends.

Comparing similarity scores between two players 102 to a threshold level is one example mechanism for determining friend recommendations between two players 102. There may be any number of different mechanisms for using the similarity score between two players to determine if those two players 102 should be recommended to each other as friends. For example, other suitable mechanisms may include making friend recommendations to a player 102 with a predetermined number of other players 102 with whom that player 102 may have the greatest similarity scores. As an example, the player 102 may be provided with five friend recommendations corresponding to five other players 102 with whom the player 102 has the greatest similarity score.

In some cases, the friend recommendations for players 102 may be sent to the client devices 104 of those players 102. The client devices 104 may display the friend recommendation(s) to the player 102. At this point, the player 102, via his or her client device 104 and/or the game management system(s) 110, may choose to interact with one or more of the player(s) 102 that were recommended as friend(s).

In example embodiments, the game management systems(s) 110 may be able to facilitate communications between a player 102 and one or more other player(s) 102 who were recommended to the player 102 as potential friend(s). This communication may entail text-based and/or voice-based communications. The game management system(s) 110 may further instantiate an online game between a player 102 and one or more other player(s) 102 who were recommended as friend(s) to the player 102. In some cases, the game management system(s) 110 may check if a player 102 and his or her recommended friend are online at the same time, and if so, the game management system(s) 110 may ask the players 102 if they wish to play the online game together. Responsive to an affirmative response from both players 102, the game management system(s) 110 may instantiate the online game between the two players 102. Instantiating the online game may entail providing the online gaming system(s) 130 an indication that the two players 102 wish to play the online game together. In some embodiments, the friend recommendation itself may include computer code that can be sent to the client device(s) 104, where the computer code can be executed by the client device(s) 104 based on player input 102 to accept or reject the friend recommendation.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
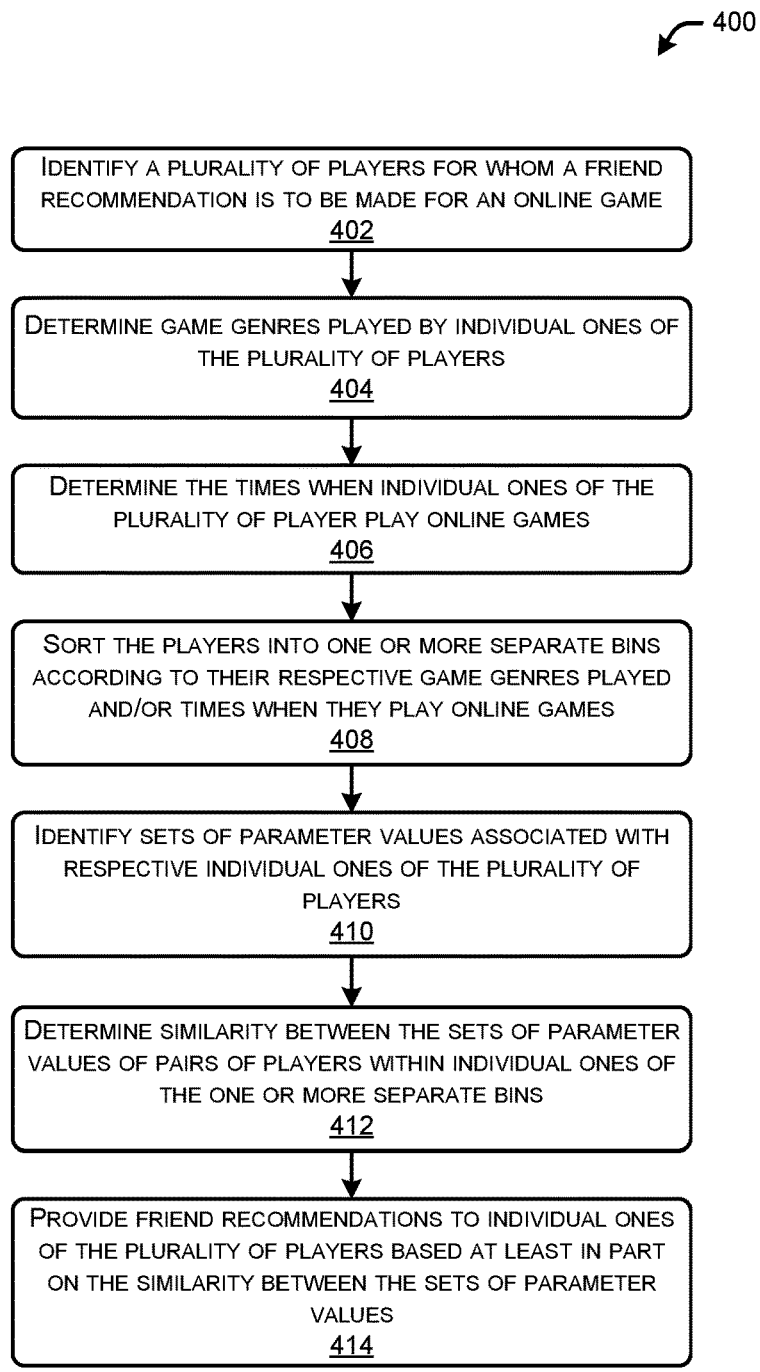
FIG. 4 illustrates a flow diagram of an example method by which a plurality of players may be provided with friend recommendations by sorting the players into one or more separate bins based at least in part on the genres of games played by individual ones of the plurality of players and the times when individual ones of the plurality of players play online games, in accordance with example embodiments of the disclosure.

FIG. 4 illustrates a flow diagram of an example method 400 by which a plurality of players 102 may be provided with friend recommendations by sorting the players 102 into one or more separate bins based at least in part on the genres of games played by individual ones of the plurality of players 102 and the times when individual ones of the plurality of players 102 play online games, in accordance with example embodiments of the disclosure. Method 400 may be performed by the game management system(s) 110, individually or in conjunction with one or more other entities of environment 100.

At block 402, a plurality of players for whom a friend recommendation is to be made for an online game may be identified. According to example embodiments, there may be a variety of mechanisms for determining whether players 102 are to be provided with a friend recommendation. In some cases, if a player 102 does not have a certain number of friends deemed to be adequate, friends may be recommended to him or her, according to the mechanisms disclosed herein. In other cases, if a player 102 is new to an online game (e.g., playing for the first time or first several times), then it may be determined that the player 102 is to be provided with friend recommendation(s). In yet other cases, if a player's current friends are determined to be a poor fit, then it may be determined that that player 102 is to be provided with new friend recommendations. The current players may be a poor fit if, for example, the players 102 generally play online games at different times of the day or on different days of the week. Other reasons for a poor friend fit may include, for example, a significant mismatch in age, interests, and/or in-game communication styles between the two players 102. Although various examples of how it may be determined that a player 102 is to be provided with a friend recommendation is discussed here and elsewhere in this disclosure, it should be noted that there may be any number of ways to determine that a friend recommendation is to be made and based on any suitable data.

At block 404, game genres played by individual ones of the plurality of players may be determined. This game genre information may be determined by the game management system(s) 110 by accessing player gaming data 120 corresponding to the players 102 for whom friend recommendations are to be made. The gaming data available in the player profiles 102 may include the game genre data.

At block 406, the times when individual ones of the plurality of players play online games may be determined. This information about when the players 102 play online games may be determined by the game management system(s) 110, again, by accessing player gaming data 120 corresponding to the players 102 for whom friend recommendations are to be made. In some cases, the play time data of players 102 may indicated the breakdown of a player's historical and/or projection of online game play time across any suitable segmentation of time. For example, the play time data may indicate the breakdown of a player's online gaming time across days of the week (e.g., 30% Monday, 50% Saturday, 20% Sunday). In other examples, the play time data may indicate a player's online gaming activity with more or less granularity. For example, in some cases, the play time data may include a day of the week, as well as a time during the day (e.g., 30% Monday evening, 20% Saturday morning, 30% Saturday afternoon, 20% Sunday evening). It should be understood that the aforementioned examples of indicating day and/or time of gameplay by individual players 102 are non-limiting examples. Indeed, there may be any number of mechanisms for indicating a player's schedule of game play. For example, a fraction of particular days of the week when a player plays online games may be indicated. Such a description may indicate, for example, that a particular player 102 played online games and/or are projected to play online games on 30% of Mondays, 0% of Tuesday, Wednesdays, and Thursdays, 27% of Fridays, 64% of Saturdays, and 43% of Sundays, over a predefined time period (e.g., the last three months). The disclosure herein contemplates any other suitable mechanism for indicating days and/or times when a particular player 102 had played and/or are expected to play online games.

At block 408, the players may be sorted into separate bins according to their respective game genres played and/or times when they play online games. As described herein, any suitable mechanism for binning the players 102 into separate categories may be used. In some cases, binning may be performed by archetypal analysis, where archetypal analysis may be performed according to the player's game genres played and times when they played. In example embodiments, the binning process may be unsupervised and/or minimally supervised. In other embodiments, a human or machine operator may guide the archetypal analysis, such as by setting parameters, such as the number of bins. Other mechanisms may also be used for binning the players 102. For example, a clustering mechanism may be used for binning. For example, k-means clustering, hierarchical clustering, distribution clustering, density clustering, etc. It should be understood that although a two-dimensional (e.g., gameplay time and genres) binning criterion is discussed with respect to method 400 of FIG. 4, according to example embodiments, any suitable number of dimensions (e.g., categories of gaming data) may be used for binning the players 102.

At block 410, sets of parameter values associated with respective individual ones of the plurality of players may be identified. As discussed herein, these sets of parameter values may be organized as any suitable data structure (e.g., a vector and/or a matrix of gaming data). The sets of parameter values may include values of each category of gaming data that is to be used for determining friend recommendations for players 102. In some cases, this parameter values of gaming data may include the gaming data that was used in the binning process (e.g., gameplay time and genres), and in other cases, the parameter values of gaming data may exclude one or more of the categories, and associated values, of the categories used in the binning process. The parameter values of gaming data may be determined from player gaming data 120 of the players 102 for whom friend recommendations are to be made.

At block 412, similarity between the sets of parameter values of pairs of players within individual ones of the one or more separate bins may be determined. To determine the similarity between pairs of players 102 pairwise similarity analysis may be performed between some of, or all of, the pairs of players 102 within each bin. The similarity analysis between the sets of parameter values may result in a similarity score corresponding to pairs of players 102. The similarity score may be indicative of the compatibility of the two players 102 to whom the similarity score corresponds. As discussed herein, the similarity score may be determined by any suitable mechanism, such as by any one or more of Pearson correlation, cosine similarity, determining a dot product of the vectors gaming data being compared, determination of a covariance, linear regression analysis, or the like, performed on the pairs of the sets of parameter values.

At block 414, friend recommendations may be provided to individual ones of the plurality of players based at least in part on the similarity between the sets of parameter values. The similarity scores associated with pairs of players 102 may be used in any suitable mechanism to provide friend recommendations. For example, the similarity scores between any two players 102 may be compared to a threshold level to determine whether the two players 102 are to be recommended to each other as friends. As another example, a player 102 may be provided with a predetermined number of other players 102 with whom that player 102 may have the greatest similarity scores as friend recommendation(s).

In some cases, the friend recommendations for players 102 may be sent to the client devices 104 of those players 102. The client devices 104 may display the friend recommendation(s) to the player 102. At this point, the player 102, via his or her client device 104 and/or the game management system(s) 110, may choose to interact with one or more of the player(s) 102 that were recommended as friend(s).

In example embodiments, the game management systems(s) 110 may be able to facilitate communications between a player 102 and one or more other player(s) 102 who were recommended to the player 102 as potential friend(s). This communication may entail text-based and/or voice-based communications. The game management system(s) 110 may further instantiate an online game between a player 102 and one or more other player(s) 102 who were recommended as friend(s) to the player 102. In some cases, the game management system(s) 110 may check if a player 102 and his or her recommended friend are online at the same time, and if so, the game management system(s) 110 may ask the players 102 if they wish to play the online game together. Responsive to an affirmative response from both players 102, the game management system(s) 110 may instantiate the online game between the two players 102. Instantiating the online game may entail providing the online gaming system(s) 130 an indication that the two players wish to play the online game together.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
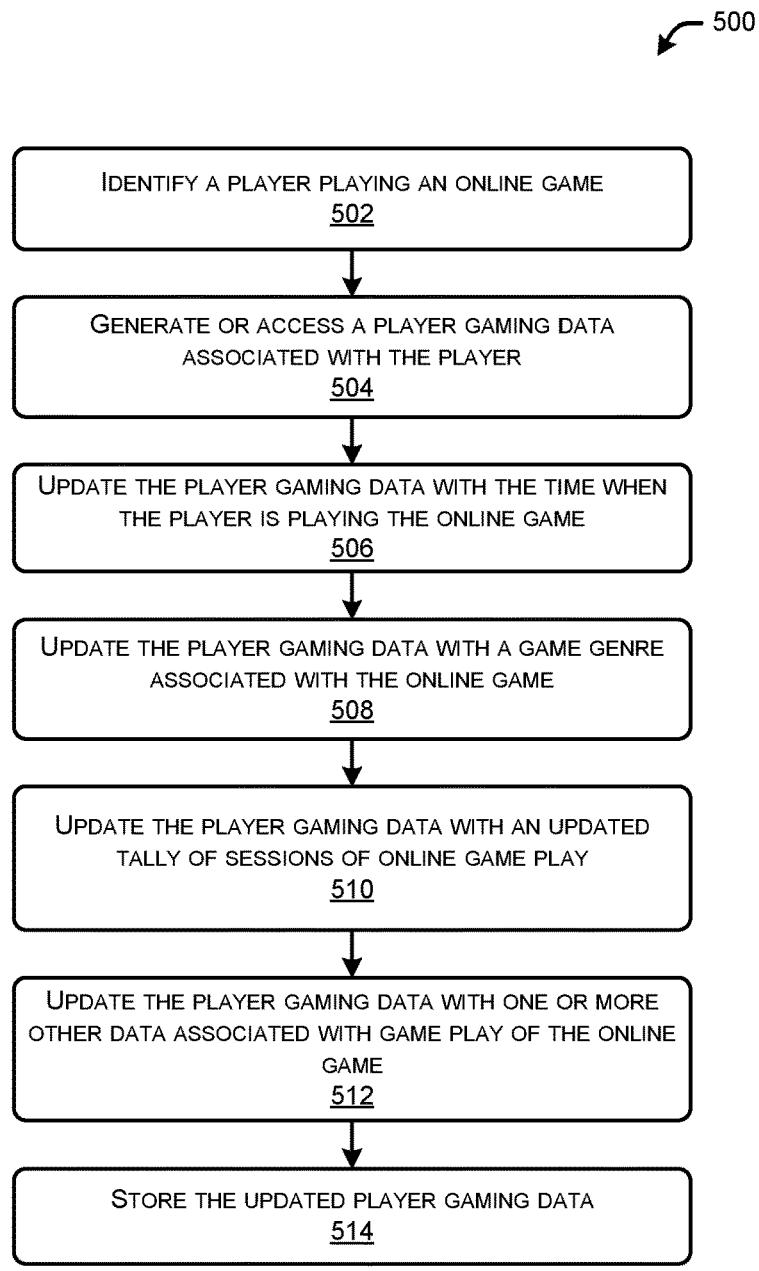
FIG. 5 illustrates a flow diagram of an example method to generate and/or update player gaming data, in accordance with example embodiments of the disclosure.

FIG. 5 illustrates a flow diagram of an example method 500 to generate and/or update player gaming data 120, in accordance with example embodiments of the disclosure. The method 500 may be performed by the game management system(s) 110, individually or in cooperation with one or more other elements of the environment 100. Method 500 may be performed by the game management system(s) 110, individually or in conjunction with one or more other entities of environment 100.

At block 502, a player playing an online game may be identified. The player 102 may be identified by any suitable identifier, such as login, password, identifier(s) of the player's client device, name, network address (e.g., Internet Protocol (IP) address, media access control (MAC) address, etc.). In example embodiments, when the player 102 may be identified when the player logs into his or her gaming account to access online games via the game management system(s) 110 and/or the online gaming system(s) 130. In some cases, a player 102 may create a new gaming account to access online games, at which time the new player 102 may be identified, such as by information provided by the player 102 to the game management system(s) 110.

At block 504, a player gaming data associated with the player may be generated or accessed. When the player logs in, existing player gaming data 120 of that player may be accessed, such as from the player profile datastore 112. If a player 102 creates a new gaming account to access online games, a new set of player gaming data 120 in which future gaming data for that new player 102 is to be logged may be created.

At block 506, the player gaming data may be updated with the time when the player is playing the online game. This game time may be determined based on when the player 102 requests the online game, when the game management system(s) 110 instantiates the online game, and/or when the online gaming system(s) 130 provide an indication of the player 102 playing the online game. In some cases, the game time may be stored directly within the player gaming data 120. Additionally, or alternatively, the game time may be used to update descriptive data associated with the player's game times (e.g., updating a tally of different times that the player plays online games). As discussed herein, the time and/or day of gameplay for a player 102 may be indicated in any variety of ways. For example, in some cases, the percentage of particular days of the week when the player played online games (e.g., the player 102 played during 45% of Saturdays over the previous year, etc.) may be indicated.

In other cases, a percentage of a player's total game play time may be indicated by day and/or time. According to example embodiments, any other suitable mechanism for indicating game play time and/or day of a player 102 may be used.

At block 508, the player gaming data may be updated with a game genre associated with the online game. The game genre may be determined, such as from a look-up table that associates online games with their genres, and logged as part of the player gaming data 120. The indication of the game genre may also be used to update information about the player's game genre data, such as by modifying the percentages of different game genres played by the player 102. At block 510, the player gaming data 120 may be updated with an updated tally of sessions online game play.

At block 512, the player gaming data may be updated with one or more other data associated with game play of the online game. There may be any variety of other gaming data received from the client device(s) 104 and/or online gaming system(s) 130 that may be logged as part of the player gaming data 120. For example, gaming data related to player chosen preferences may be used to update the player gaming data 120. At block 514, the updated player gaming data 120 may be stored. The player gaming data 120 may be stored in any suitable location, such as player profile datastore 112.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6A:
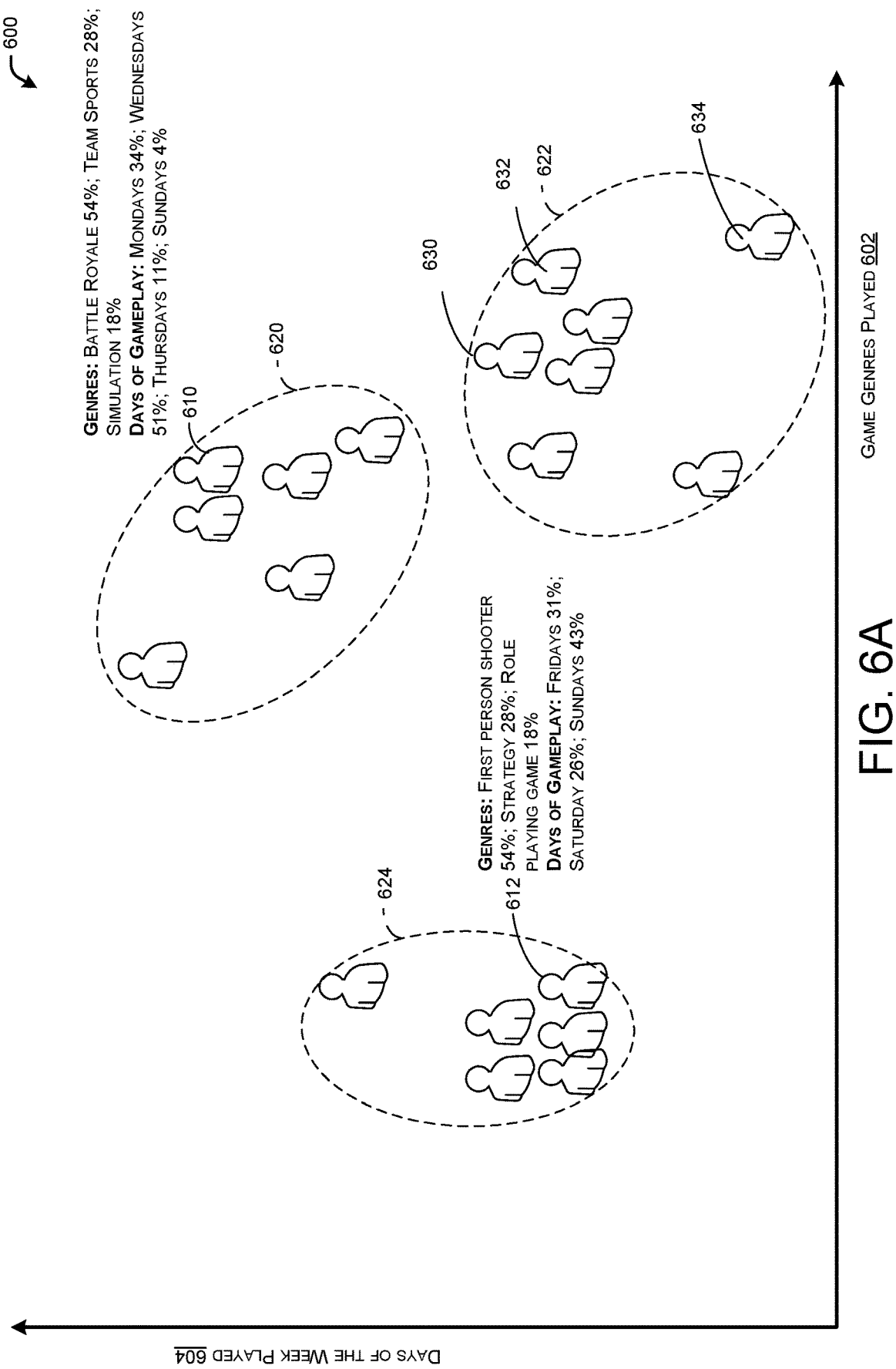
FIGS. 6A and 6B illustrates a chart of an example set of players for whom a friend recommendation may be made based at least in part on binning the players and then determining similarity of parameters pertaining to the players within bins, in accordance with example embodiments of the disclosure.
Figure 6B:
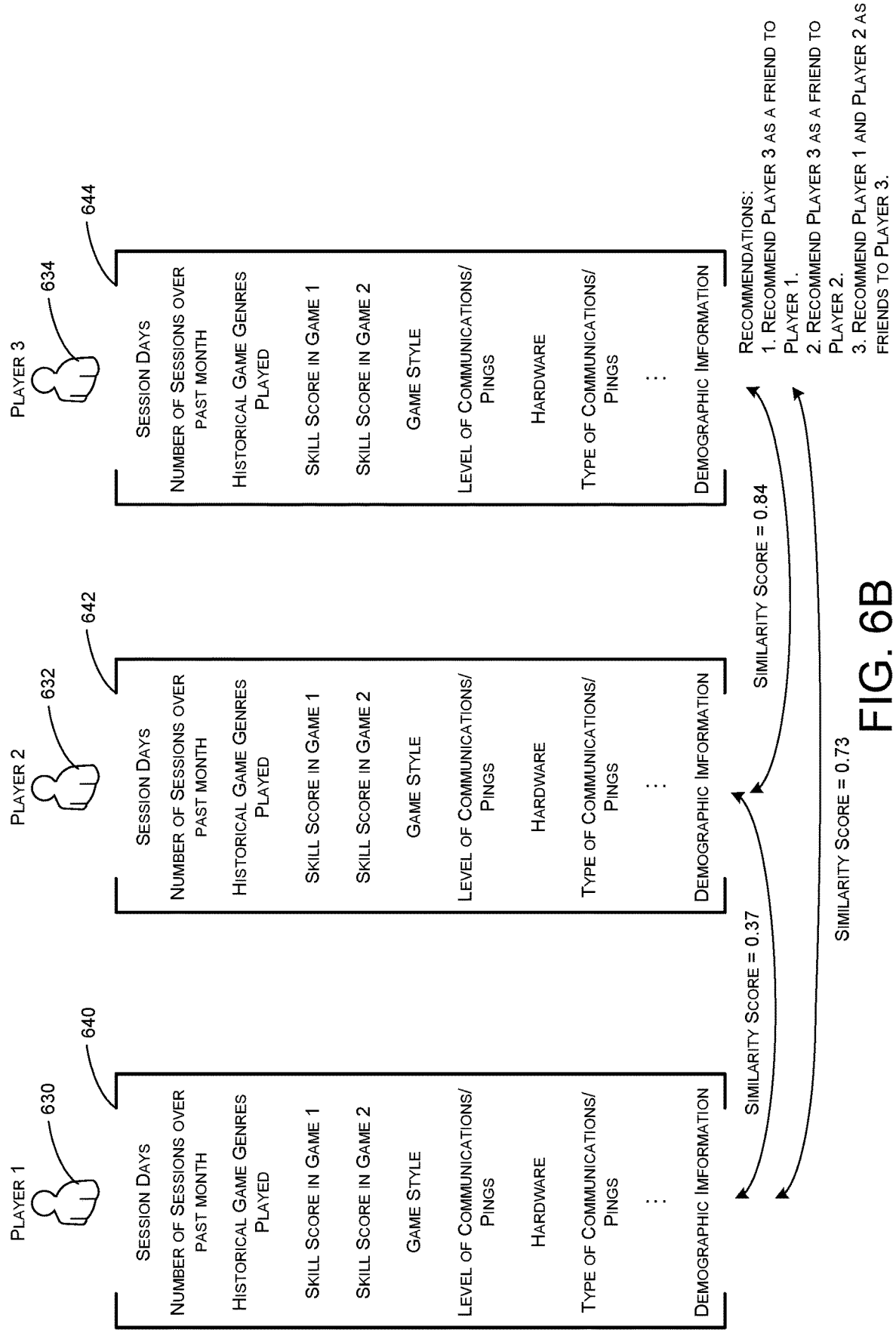

FIGS. 6A and 6B illustrate a chart 600 of an example set of players 102 for whom a friend recommendation may be made based at least in part on binning players 610, 612, 630, 632, 634 and then determining similarity of parameters pertaining to the players 610, 612, 630, 632, 634 within bins, in accordance with example embodiments of the disclosure. As shown, game genres played 602 and days of the week played 604 may be determined for each of the players 610, 612, 630, 632, 634. For example, player 610 may have corresponding parameter values and player 612 may have corresponding parameter values, as shown. In this way, individual ones of the players 610, 612, 630, 632, 634 may have corresponding parameter values corresponding to the categories of game genres played 602 and days of the week played 604, as can be determined from the respective player gaming data 120 of individual players 610, 612, 630, 632, 634.

Based at least in part on the game genres played 602 and days of the week played 604, an archetypal analysis may be performed to determine clusters and/or bins 620, 622, 624 of players 610, 612, 630, 632, 634. For example, player 610 may be binned within the first bin 620, player 612 may be binned within the second bin, and players 630, 632, 634 may be binned within the third bin 622. As discussed herein, any suitable mechanism may be used to determine the bins 620, 622, 624, such as archetypal analysis. Although one particular mechanism for indicating the game genres and/or days of the week are shown here, it should be appreciated that there may be any suitable number of ways to represent this gaming data, as disclosed herein.

After the players 610, 612, 630, 632, 634 have been binned, gaming data corresponding to the players 610, 612, 630, 632, 634 may be generated, such as from the players' player gaming data 120. For example, player 1 630 may have gaming data arranged as vector 640, player 2 632 may have gaming data arranged as vector 642, and player 3 634 may have gaming data arranged as vector 644. The vectors 640, 642, 644 may include the categories of gaming data that may be used for the purposes of determining friend recommendations. Although for the purposes of illustration, category names are shown in each of vectors 640, 642, 644, it should be understood that each of the elements listed with vectors 640, 642, 644 represent a corresponding value of that category pertaining to the corresponding player 630, 632, 634. Each of player 1 630, player 2 632, and player 3 634 had been binned together in bin 622. Therefore, pairwise similarity scores may be determined between each of vectors 640, 642, 644 to determine friend recommendations between player 1 630, player 2 632, and player 3 634.

For example, the similarity score between vector 640 and vector 642 may be 0.37, the similarity score between vector 642 and vector 644 may be 0.84, and the similarity score between vector 640 and vector 644 may be 0.73. The similarity scores in this example may be a Pearson correlation and may have a range between −1 and 1, where negative values represent an inverse correlation, zero represents no correlation, positive values represent direct correlation, −1 represents a perfectly inverse correlation, and 1 represents a perfectly direct correlation. Each of the vectors 640, 642, 644 in this example may have a positive Pearson correlation with each other. This may often be the case when performing the pairwise similarity analysis, since the players 610, 612, 630, 632, 634 have already been binned according to a subset of categories of gaming data.

Continuing with the example of FIGS. 6A and 6B, a thresholding mechanism may be used to provide friend recommendations, where a threshold value of 0.7 may be used to identify friend recommendations. Therefore, player 1 630 and player 2 632 may be recommended as friends to player 3 634, player 3 634 may be recommended as a friend to player 2 632, and player 3 634 may be recommended as a friend to player 1 630.

Figure 7:
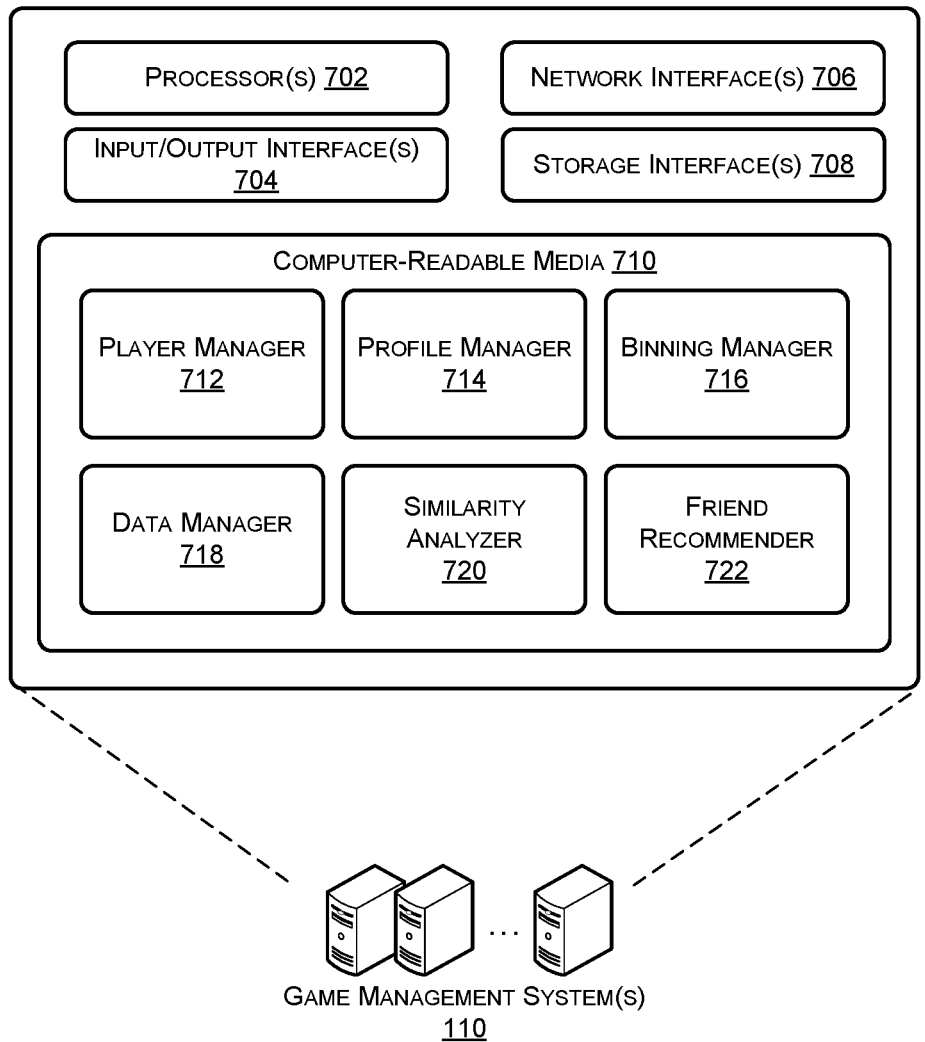
FIG. 7 illustrates a block diagram of example game management system(s) that may provide friend recommendations for online games, in accordance with example embodiments of the disclosure.

FIG. 7 illustrates a block diagram of example game management system(s) 110 that may provide friend recommendations for online games, in accordance with example embodiments of the disclosure. The game management system(s) 110 may include one or more processor(s) 700, one or more input/output (I/O) interface(s) 702, one or more network interface(s) 704, one or more storage interface(s) 706, and computer-readable media 710.

In some implementations, the processors(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the game management system(s) 110 to detect interaction with a user and/or other system(s), such as one or more online gaming system(s) 130. The I/O interface(s) 702 may include a combination of hardware, software, and/or firmware and may include software drivers for enabling the operation of any variety of I/O device(s) integrated on the game management system(s) 110 or with which the game management system(s) 110 interacts, such as displays, microphones, speakers, cameras, switches, input devices, and/or any other variety of sensors, or the like.

The network interface(s) 704 may enable the game management system(s) 110 to communicate via the one or more network(s). The network interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows the game management system(s) 110 to transition between various standards. The network interface(s) 704 may further enable the game management system(s) 110 to communicate over circuit-switch domains and/or packet-switch domains.

The storage interface(s) 706 may enable the processor(s) 700 to interface and exchange data with the computer-readable medium 710, as well as any storage device(s) external to the game management system(s) 110, such as the player profile datastore 112.

The computer-readable media 710 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 710 may be implemented as computer-readable storage media (CRSM), which may be any available physical media accessible by the processor(s) 700 to execute instructions stored on the memory 710. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 700. The computer-readable media 710 may have an operating system (OS) and/or a variety of suitable applications stored thereon. The OS, when executed by the processor(s) 700 may enable management of hardware and/or software resources of the game management system(s) 110.

Several functional blocks having instruction, data stores, and so forth may be stored within the computer-readable media 710 and configured to execute on the processor(s) 700. The computer readable media 710 may have stored thereon a player manager 712, a profile manager 714, a binning manager 716, data manager 718, a similarity analyzer 720, and a friend recommender 722. It will be appreciated that each of the functional blocks 712, 714, 716, 718, 720, 722, may have instructions stored thereon that when executed by the processor(s) 700 may enable various functions pertaining to the operations of the game management system(s) 110.

The instructions stored in the player manager 712, when executed by the processor(s) 700, may configure the game management system(s) 110 to manage player 102 accounts for accessing online games, such as online games hosted by the online gaming system(s) 130. The player manager 712 may include instructions that allow tracking gaming data pertaining to each player 102, as well as managing the access and/or online gaming of the players 102.

The instructions stored in the profile manager 714, when executed by the processor(s) 700, may configure the game management system(s) 110 to manage the player gaming data 120 of the players 102. For example, the player gaming data 120 may be stored, accessed, and/or updated with relevant gaming data by the processor(s) 700.

The instructions stored in the binning manager 716, when executed by the processor(s) 700, may configure the game management system(s) 110 to associated gaming data values for categories of gaming data to be used for binning to their respective players 102. The processor(s) 700 are further configured to use the gaming data values to perform any variety of binning algorithms (e.g., archetypal analysis, clustering, covariance, etc.) to separate the players 102 bins according to gaming data values of the players 102 in the gaming data categories used for binning.

The instructions stored in the data manager 718, when executed by the processor(s) 700, may configure the game management system(s) 110 to receive data for the purposes of updating player gaming data 120 and/or access player gaming data 120 for generating friend recommendations. The processor(s) 700 may track sources of gaming data, determine to whom the gaming data pertains, and generate updates to the player gaming data 120 using the incoming gaming data.

The instructions stored in the similarity analyzer 720, when executed by the processor(s) 700, may configure the game management system(s) 110 to perform pairwise similarity analysis between the gaming data of players 102 who have been binned together. The similarity analysis may result in a similarity scores corresponding to pairs of players 102. The similarity score may be determined by the processor(s) 700 using any suitable mechanism, such as Pearson correlation, cosine similarity, determining a dot product of vectors being compared, determination of a covariance, linear regression analysis, combinations thereof, or the like.

The instructions stored in the friend recommender 722, when executed by the processor(s) 700, may configure the game management system(s) 110 to use similarity scores between pairs of players 102 to determine whether the pairs of players 102 should be recommended to each other as potential friends. This process may be performed by any suitable mechanism, such as by comparing the similarity scores between two players 102 to a threshold level or providing friend recommendations as a predetermined number of other players 102 who have the highest similarity score with a particular player 102.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing:
(a) sets of player gaming data associated with respective players, each of the sets of player gaming data including telemetry data corresponding to one of the players and one or more online video games played by the players; and
(b) computer-executable instructions that, when executed by the one or more processors, cause the one or more processors to:
identify a first player to whom friend recommendations are to be made for a first online video game;
retrieve, from among the player gaming data of the first player, a first subset of player gaming data, the first subset of player gaming data including first game genre data and first gameplay time data associated with a second online video game;
compare the first game genre data and first gameplay time data to subsets of the player gaming data of one or more of the other players, the subsets of the player gaming data including second telemetry data associated with the second online video game, the second telemetry data including second game genre data and second gameplay time data;
based on the comparison using the first game genre data and the first gameplay time data, group the players into bins, each of the players being associated with one of the bins and the first player being associated with a first bin;
calculate a similarity score of the other players within the first bin relative to the first player based at least in part on the first telemetry data and the second telemetry data;
determine, based on the calculated similarity scores, friend recommendations including one or more of the players to recommend as friends to the first player for the first online video game; and
store, in association with the first player, the friend recommendations for the first online video game.

2. The system of claim 1, the computer-executable instructions further cause the one or more processors to:
transmit to or cause to display at a client device of the first player, a notification including the friend recommendations.

3. The system of claim 2, wherein the computer-executable instructions further cause the one or more processors to:
receive from the client device of the first player, in response to the notification, an acceptance one of the friend recommendations identifying one of the recommended players;
transmit, based on the acceptance, a friend request to the client device of the one of the recommended players;
receive an approval of the friend request from the client device of the one of the recommended players; and
store information indicating the relationship between the first player and the one of the recommended players.

4. The system of claim 2, wherein:
the friend recommendation is transmitted during a first time instance,
the player gaming data includes friend information, the friend information identifying friend relationships between the respective player and one or more of the other players for each of the online video games, and
the computer-executable instructions further cause the one or more processors to:

store, in the friend information of the first player, information identifying, for the first online video game, a friend relationship, between the first player and at least one of the players included in the friend recommendation; and transmit, to the client device of the first player, in a second gaming session during a second time instance subsequent to the first time instance, the friend information of the first player for the first online video game, the friend information including the at least one of the players included in the friend recommendation.

5. The system of claim 1, wherein to group the players into bins, the computer-executable instructions further cause the one or more processors to:

perform an archetypal analysis on the subsets of the player gaming data of the one or more of the other players and the first subset of the player gaming data.

6. The system of claim 1, wherein the second gameplay time data indicates days of the week when the one or more other players play the one or more online video games.

7. The system of claim 1, wherein to calculate the similarity score of the other players in the first bin relative to the first player, the computer-executable instructions further cause the one or more processors to:

determine one of: (i) a Pearson similarity correlation between the first subset of player gaming data and the subsets of the player gaming data of the one or more of the other players, or (ii) a cosine similarity correlation between the first subset of player gaming data and the subsets of the player gaming data of the one or more of the other players.

8. The system of claim 1, wherein the player gaming data further includes player gaming profile data.

9. A computer-implemented method, comprising:

identifying a first player to whom friend recommendations are to be made for a first online video game;

retrieving, from among player gaming data, a first subset of player gaming data associated with the first player, the first subset of player gaming data including first game genre data and first gameplay time data associated with a second online video game;

comparing the first game genre data and first gameplay time data to subsets of the player gaming data of one or more of the other players, the subsets of the player gaming data including second telemetry data associated with the second online video game, the second telemetry data including second game genre data and second gameplay time data;

based on the comparison using the first game genre data and the first gameplay time data, grouping the players into bins, each of the players being associated with one of the bins and the first player being associated with a first bin;

calculating a similarity score of the other players within the first bin relative to the first player based at least in part on the first telemetry data and the second telemetry data;

determining, based on the calculated similarity scores, friend recommendations including one or more of the players to recommend as friends to the first player for the first online video game; and storing, in association with the first player, the friend recommendations for the first online video game.

10. The computer-implemented method of claim 9, wherein the first online video game is a game that is unplayed by the first player.

11. The computer-implemented method of claim 9, wherein the first online video game is a game that is unplayed by the first player and the other players.

12. The computer-implemented method of claim 9, wherein the similarity score is at least one of a Pearson similarity coefficient or a cosine similarity coefficient.

13. The computer-implemented method of claim 9, further comprising:

transmit to or cause to display at a client device of the first player, a notification including the friend recommendations.

14. The computer-implemented method of claim 13, further comprising:

receiving from the client device of the first player, in response to the notification, an acceptance one of the friend recommendations identifying one of the recommended players;

transmit, based on the acceptance, a friend request to the client device of the one of the recommended players;

receive an approval of the friend request from the client device of the one of the recommended players; and store information indicating the relationship between the first player and the one of the recommended players.

15. A system, comprising:

one or more processors; and one or more computer-readable media storing computer-executable instructions that, when executed by the one or more processors, cause the one or more processors to:

determine a first set of gaming data associated with a first player, the first set of gaming data including first telemetry data associated with a first online game, the first telemetry data including a first game genre data and a first gameplay time data associated with the first player;

determining a second set of gaming data associated with a second player, the second set of gaming data including second telemetry data associated with the first online game, the second telemetry data including a second game genre data and a second gameplay time data associated with the second player;

determine that the first player and the second player are to be binned together based at least in part on the first game genre data, the first gameplay time data, the second game genre data, and the second gameplay time data;

determine, based at least in part on the first set of gaming data and the second set of gaming data and on the first player and second player being binned together, a similarity score between the first player and the second player;

determine, based at least in part on the similarity score, that the first player and the second player are to be recommended as friends to play a second online game;

provide, to the first player, a first friend recommendation of the second player for playing the online game; and provide, to the second player, a second friend recommendation of the first player for playing the online game.

16. The system of claim 15, wherein the first set of gaming data is based at least in part on gameplay by the first player on a third online game.

17. The system of claim 15, wherein to determine that the first player and the second player are to be recommended as friends to play the second online game, the computer-executable instructions further cause the one or more processors to:

determine that the similarity score is greater than a threshold level.

18. The system of claim 15, wherein the first player and the second player are among a plurality of players, and wherein the computer-executable instructions further cause the one or more processors to:

separate the plurality of players into one or more bins based at least in part on sets of gaming data associated with each of the plurality of players, the sets of gaming data including the first set of gaming data and the second set of gaming data.

19. The system of claim 18, wherein to separate the plurality of players into one or more bins, the computer-executable instructions further cause the one or more processors to:

perform an archetypal analysis based at least in part on the sets of gaming data.

20. The system of claim 15, wherein the computer-executable instructions further cause the one or more processors to:

determine that friend recommendations are to be made to the first player and the second player.

\* \* \* \* \*